United States Patent [19]

Schmitt

[11] Patent Number: 5,031,295
[45] Date of Patent: Jul. 16, 1991

[54] MULTI-PURPOSE TURRET ASSEMBLY

[75] Inventor: Werner H. Schmitt, Falls Church, Va.

[73] Assignee: Hoppmann Corporation, Chantilly, Va.

[21] Appl. No.: 435,288

[22] Filed: Nov. 9, 1989

[51] Int. Cl.$^5$ ............................................. B23P 19/04
[52] U.S. Cl. .................................. 29/33 J; 29/33 K; 29/35.5; 29/785
[58] Field of Search ...................... 29/33 J, 33 K, 35.5, 29/36, 785, 792

[56] References Cited

U.S. PATENT DOCUMENTS

| | | | |
|---|---|---|---|
| 3,024,523 | 3/1962 | Donaldson | 29/208 |
| 3,238,699 | 3/1966 | Morton | |
| 3,840,966 | 10/1974 | Reid et al. | 29/208 B |
| 4,201,505 | 5/1980 | Gerhart et al. | 414/27 |
| 4,313,260 | 2/1982 | Yeo et al. | 29/35.5 X |
| 4,567,648 | 2/1986 | Doty | 29/785 X |

FOREIGN PATENT DOCUMENTS 56-163052 12/1981 Japan ..................... 29/785

Primary Examiner—Steven C. Bishop

[57] ABSTRACT

A self contained exchangeable turret assembly includes a turret module having a first turret wheel with a plurality of openings disposed around an outlet circumferential surface thereof for positioning a first work piece and a second turret wheel having a plurality of openings disposed around an outer circumferential surface thereof for positioning a second work piece in a predetermined position relative to a first work piece. A turret drive shaft and a plurality of tool stations are operatively mounted on said turret module. The first and second turret wheels are concentrically position on the turret drive shaft in a predetermined relationship to permit selective alignment of the plurality of openings disposed around the outer circumferential surfaces of the first and second turret wheels. A support structure includes a drive member operatively mounted relative to the support housing for imparting rotation to the turret drive shaft and the first and second turret wheels. A cam member is operatively mounted relative to the support housing and the tool stations for selectively actuating the tool stations as the drive means rotates the first and second turret wheels. The turret module is a self contained, exchangeable turret readily attachable to the support housing and engageable with the drive means and readily detachable from the support housing and disengageable from said drive means for permitting one of a plurality of turret modules capable of preforming work on a variety of work pieces having various configurations to be readily, operatively connected to said supporting housing.

12 Claims, 5 Drawing Sheets

MULTI-PURPOSE TURRET ASSEMBLY

BACKGROUND OF THE INVENTION

1. Field of the Invention

The present invention is directed to a multi-purpose turret assembly wherein one of a plurality of turret modules may be utilized for assembling a variety of various size parts in an automatic assembly work station.

2. Description of Background Art

Hithertofore, turret assemblies have been manufactured to perform a specific work process on an object which has a predetermined size. As the size of the object is varied, a new turret assembly may be required. However, currently, an individual is required to purchase an entire drive mechanism and turret assembly each time the configuration of an object is changed with regard to an assembling process. More specifically, if a particular part to be assembled varies in shape and size, it is necessary to purchase an entirely new turret and drive mechanism in order to process the part in an assembling procedure.

With our modern age of industrial automation, it has reached a stage where many manufacturing processes are conducted with a minimal amount of human labor and/or intervention. In addition, the automated processes work at a much higher speed and produce an output capacity which is greater than the output capacity obtained with manual labor. The end product is characterized by a uniform quality with a reduced waste due to the fact that the parts are manufactured by the same machinery utilizing the same method. Productivity is greatly enhanced due to automation.

One shortcoming of automation relates to the high cost of purchasing automated machinery. Machinery and systems which are dedicated to processing only one product may require a considerable amount of capital investment. The machinery must be utilized over an extended period of time in order to fully amortize the cost of the machinery.

SUMMARY AND OBJECTS OF THE INVENTION

It is an object of the present invention to provide a multi-purpose turret assembly wherein one of a plurality of turrets may be readily positioned on a common support structure for permitting work to be performed on a plurality of various size and shaped objects.

Another object of the present invention is to provide a multi-purpose turret assembly wherein first and second turret wheels are concentrically positioned on a turret drive shaft to permit multiple parts to be aligned and worked on in a single turret assembly.

A further object of the present invention is to provide a multi-purpose turret assembly wherein a cam member may be readily attached to the support housing adjacent to the tool stations for selectively actuating the tool stations as the first and second turret wheels rotate relative thereto.

Another object of the present invention is to provide universally deployable automation machinery which can be quickly adopted or changed over to handle a variety of products rather than to be dedicated to a single product or processing operation.

A further object of the present invention is to provide a multi-purpose turret assembly which permits quick product changeover by preferably low skill level personnel.

A still further object of the present invention is to provide a multi-purpose turret assembly which should not require complex assembly and sensitive adjustments and calibrations.

Another object of the present invention is to provide a multi-purpose turret assembly that does not introduce qualitative product variances because of certain machine adjustments/calibrations and does not result in a storage requirement for a multitude of loose, exchangeable components thus complicating the logistics system.

The present invention permits simple and expedient changeover from one manufacturing product and/or process to another, while yielding to the objectives referred to above.

These and other objects of the present invention are achieved by providing a self-contained exchangeable turret assembly having a turret module. The turret module includes a first turret wheel having a plurality of openings disposed around an outer circumferential surface thereof for positioning a first work piece. A second turret wheel is provided having a plurality of openings disposed around an outer circumferential surface thereof for positioning a second work piece in a predetermined position relative to a first work piece. A turret drive shaft is provided and a plurality of tool work stations.

The first and second turret wheels are concentrically positioned on the turret drive shaft in a predetermined relationship to permit selective alignment of the plurality of openings disposed around the outer circumferential surfaces of the first and second turret wheels. A support structure is provided which includes a drive member operatively mounted within the support housing for imparting rotation to the turret drive shaft and the first and second turret wheels. A cam member is operatively mounted relative to the support housing and the tool stations for selectively actuating the tool stations as the drive member rotates the first and second turret wheels.

The present invention permits a turret module to be readily disconnected from the support structure and disengaged from the cam member so as to permit another turret module to be readily positioned on the common support structure and readily disposed adjacent to the same or another cam member to permit the second turret module to operate on distinct work pieces as compared to the first turret module.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
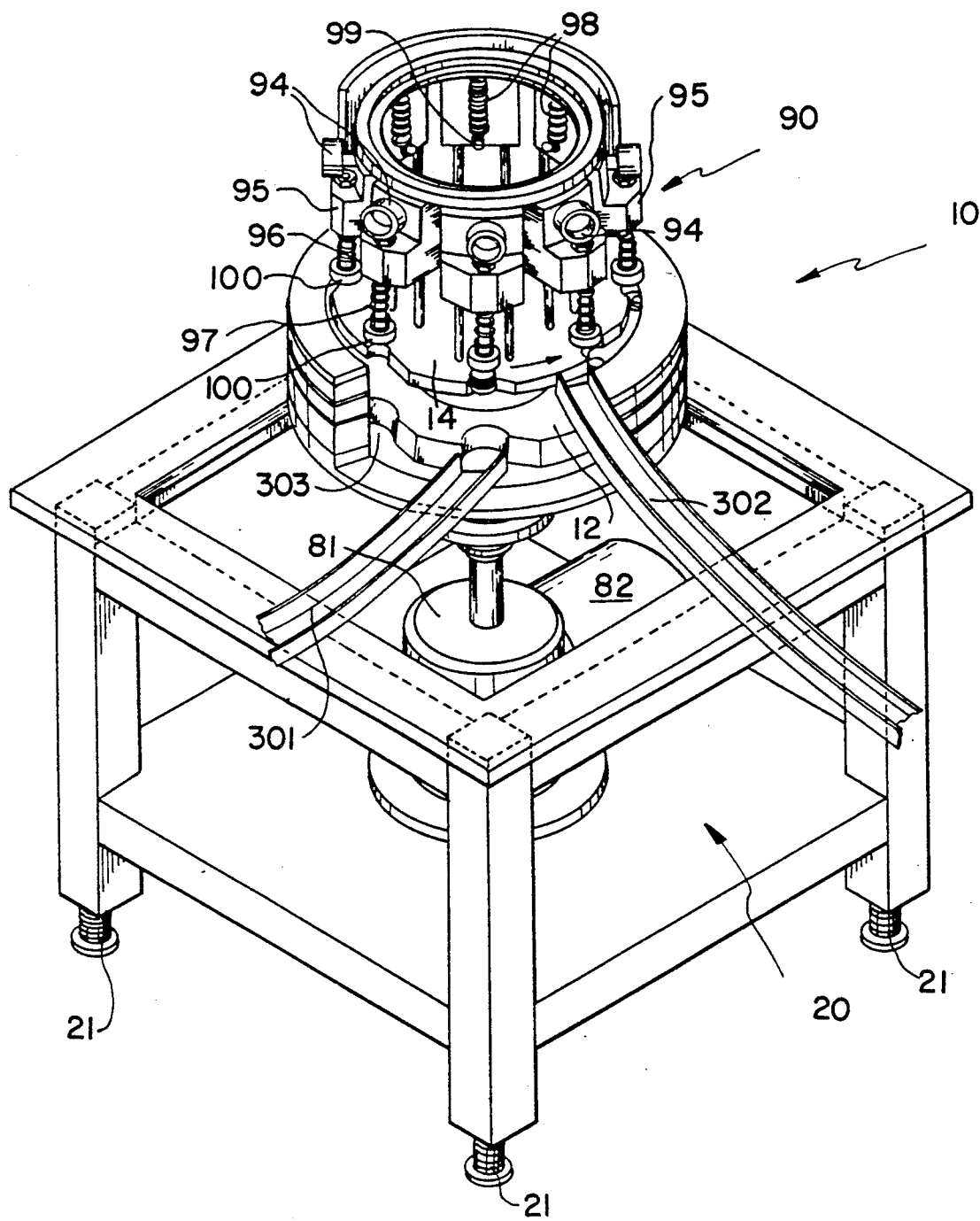
FIG. 1 is a perspective view illustrating the multi-purpose turret assembly of the present invention connected to a support structure.
Figure 2:
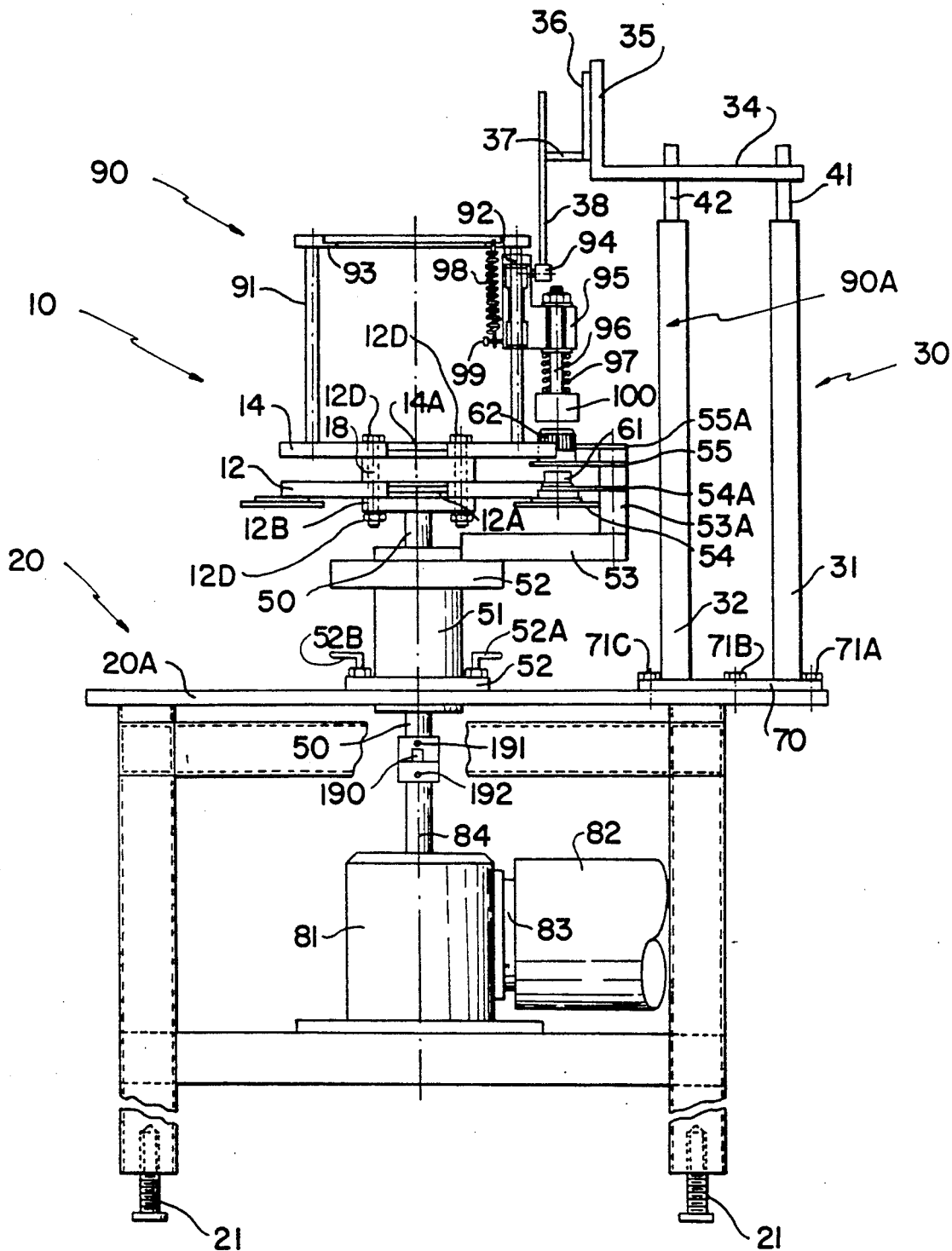
FIG. 2 is a partial cross-sectional view illustrating the arrangement of the first and second turret wheels relative to a tool station.
Figure 3:
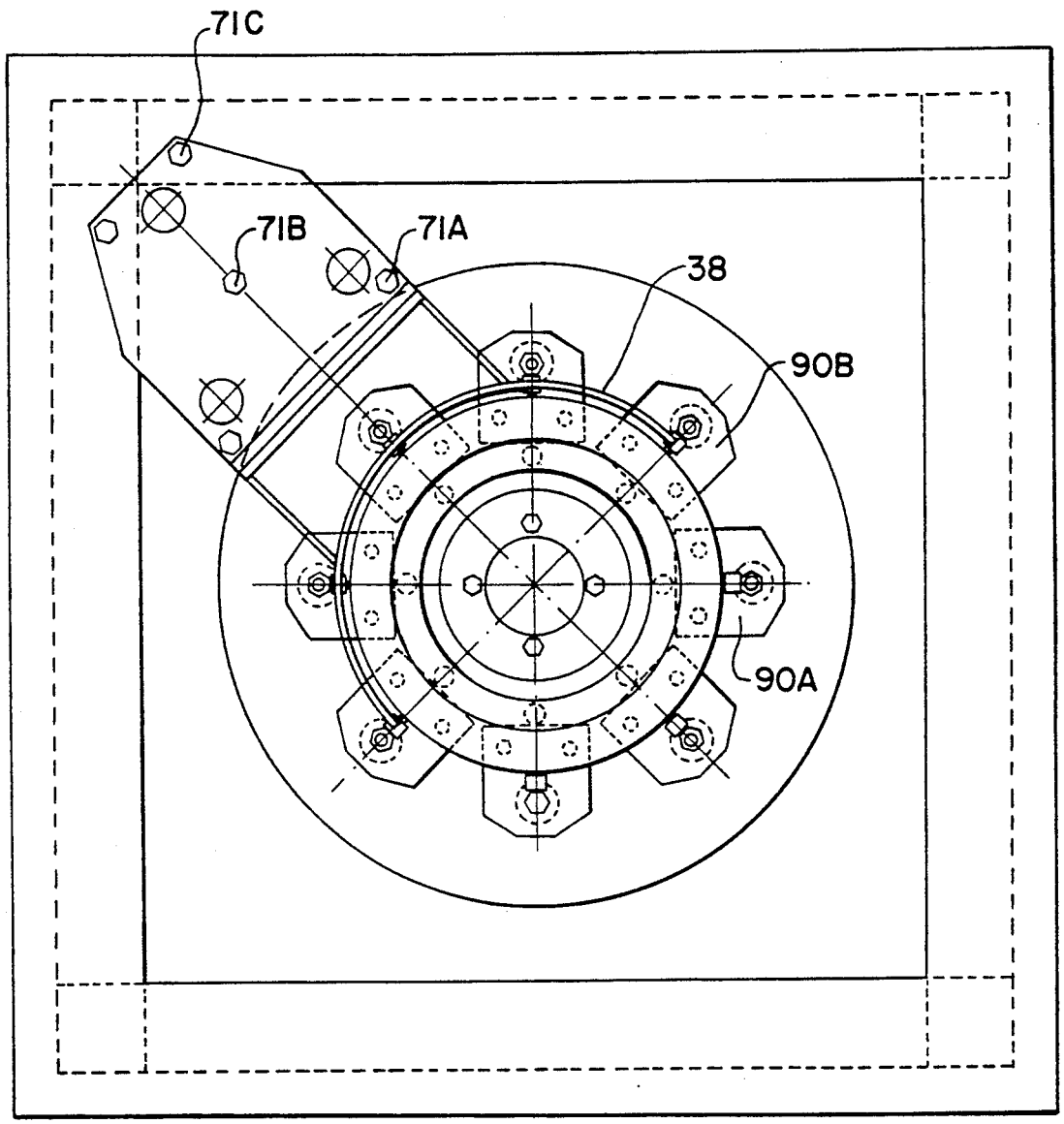
FIG. 3 is a top plan view of the multi-purpose turret assembly illustrated in FIG. 1.

As illustrated in FIGS. 1-3, a self-contained exchangeable turret assembly 10 includes a support structure 20, a removable, exchangeable timing cam assembly 30 and a turret module 90. The three units are designed to be readily connected to and detached from each other to permit an individual to readily change the turret module 90 to accommodate various size, shape and configuration work pieces.

The support structure 20 includes adjustable legs 21 for accurately mounting the support structure 20 relative to the floor in a work place. Within the support structure 20 is positioned a motor 82 including a motor output shaft 83. The motor output shaft 83 is connected to a reducer 81. The reducer 81 includes a reducer output shaft 84. A coupling 190 is operatively connected by means of a bolt 192 to the reducer output shaft 84.

The turret module 90 includes a turret drive shaft 50 operatively disposed for rotation within a sleeve 51. The turret drive shaft 50 is connected to the coupling 190 by means of a bolt 191. The sleeve 51 is removably affixed to a top surface 20A of the support housing 20 by means of a support mounting plate 52 and quick disconnect levers 52A, 52B.

The sleeve 51 includes a plate support 52 affixed to the sleeve 51 and prevented from rotation. A plate support 53 is secured to the plate support 52. A mounting rod 53A is affixed to an outer end of the plate support 53. A first plate 54 is connected to the mounting rod 53A and secured relative thereto to prevent rotation of the first plate 54. Similarly, a second plate 55 is connected to the mounting rod 53A and prevented from rotation. A first cam guide 54A accurately guides a work piece 61 relative to a first turret wheel 12. In addition, a second cam guide 55A accurately guides a second work piece 62 relative to a second turret wheel 14.

The first turret wheel 12 includes an aperture 12A which is secured to the turret drive shaft 50. A connecting plate 12B is utilized to mount the first turret wheel 12 relative to the turret drive shaft 50. Similarly, the second turret wheel 14 includes an aperture 14A. A spacer plate 18 is mounted between the first turret wheel 12 and the second turret wheel 14. Bolts 12D, 12D are utilized to concentrically arrange the first turret wheel 12, the spacer plate 18 and the second turret wheel 14 relative to each other. The first turret wheel 12 and the second turret wheel 14 are locked to the turret drive shaft 50 so as to rotate in synchronized movement relative to each other.

The turret module 90 includes a plurality of work tools 90A mounted around the second turret wheel 14. Legs 91, 92 are provided for affixing the turret module 90 relative to the second turret wheel 14. For simplicity, only the legs 91, 92 are illustrated in the drawings. However, a pair of legs are mounted adjacent each work tool 90A in order to guide a slide housing 95 which is movable up and down on the legs 91, 92 as the turret module 90 rotates together with the turret drive shaft 50.

The work tool 90A includes the slide housing 95 and a cam follower 94. In addition, a rod 96 is mounted for reciprocation within the slide housing 95. A spring 97 guides the movement of the rod 96 and returns the rod to a predetermined position after a work tool engaging member 100 engages the second work piece 62. In addition, a return spring 98 is connected to a pin 99 secured to the slide housing 95 to return the slide housing 95 to a disengaged position after the work tool engaging member 100 completes the work on the work piece 62.

A removable, exchangeable timing cam 30 is provided for readily being connected to the upper surface 20A of the support housing 20 and also being readily disconnected therefrom. A cam support 70 is affixed to the upper surface 20A of the support housing 20 by means of bolt 71A, 71B and 71C. Support legs 31, 32 including adjusting members 41, 42 are affixed to the cam support 70. A flange 35 is connected to a support plate 34. Similarly, a flange 36 and support plate 37 are affixed relative to each other and connected to a cam surface 38. The removable, exchangeable timing cam 30 is adjustably mounted so as to accurately position the cam surface 38 relative to the cam follower 94.

As illustrated in FIG. 3, two work tools 90A, 90B are illustrated and disposed around the circumference of the turret module 90. However, multiple work tools 90A, 90B are provided one at each of the specific work stations of the turret module 90 around the circumference thereof. The cam surface 38 is illustrated in FIG. 3 as extending around a predetermined portion of the outer circumferential surface of the tool module 90. In this way, the cam surface 38 is disposed to engage and disengage one of the cam followers 94 positioned on each of the work tools 90A, 90B as the work tools 90A, 90B rotate around together with the turret drive shaft 50.

Figure 4:
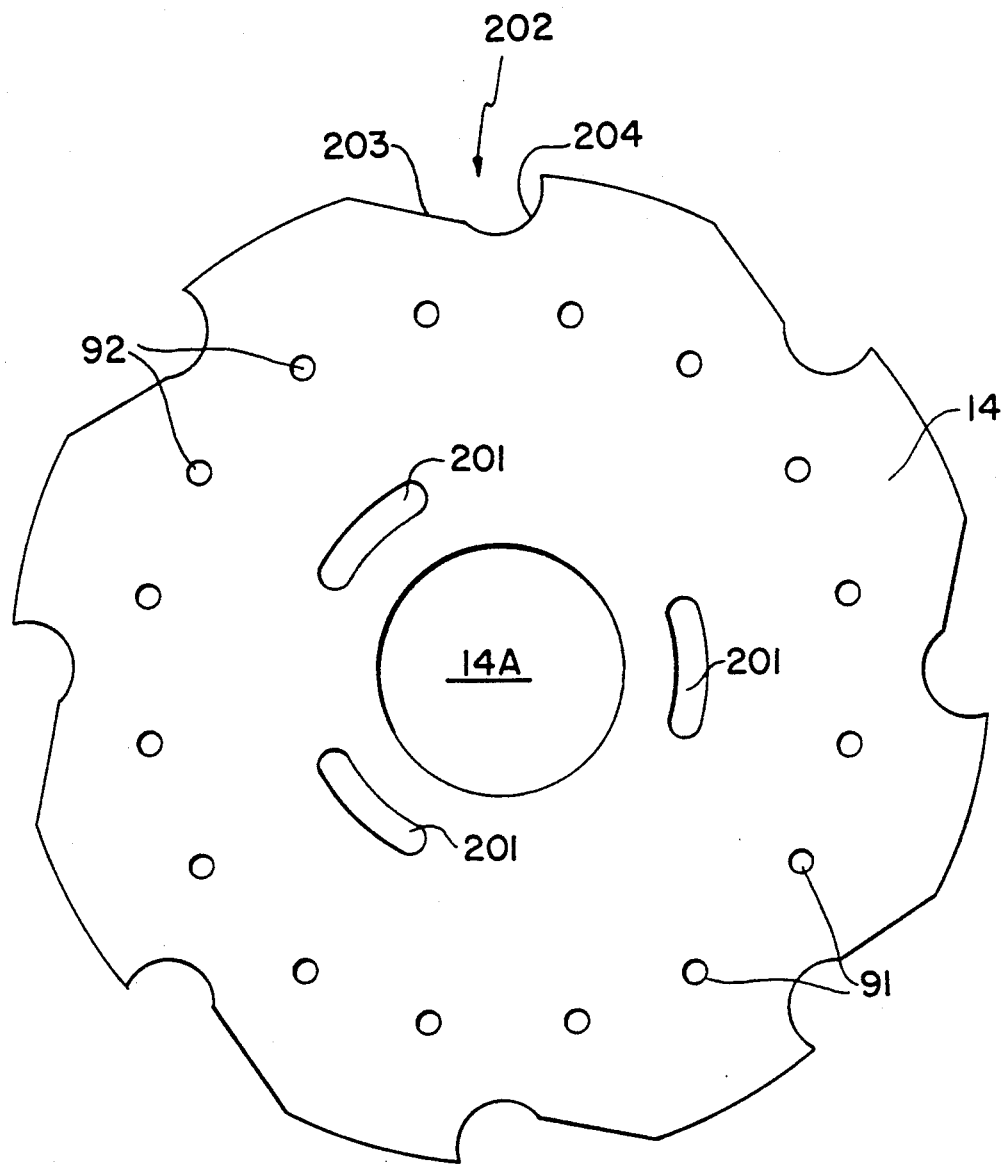
FIG. 4 is a top plan view of an upper turret wheel.

FIG. 4 illustrates the second turret wheel 14 which includes a plurality of recesses 202 disposed around the outer peripheral surface thereof. Each recess 202 includes an inclined guide surface 203 and a locating notch 204. For brevity, numbers have not been applied to each of the recesses 202. However, each recess is designed in a similar manner and permits the accurate positioning of a second work piece 62 relative to the second turret wheel 14. Adjusting slots 201 are provided adjacent to the aperture 14A. The adjusting slots 201 are utilized to accurately position the second turret wheel 14 relative to the first turret wheel 12. Legs 91, 92 are disposed in pairs adjacent to each of the recesses 202. A slide housing 95 is mounted on each pair of legs 91, 92 which are disposed at each of the recesses 202. In this way, the slide housing 95 is accurately disposed to slide up and down as the turret module 90 rotates and the cam surface 38 engages each of the cam followers 94 to actuate the work tool member 100.

Figure 5:
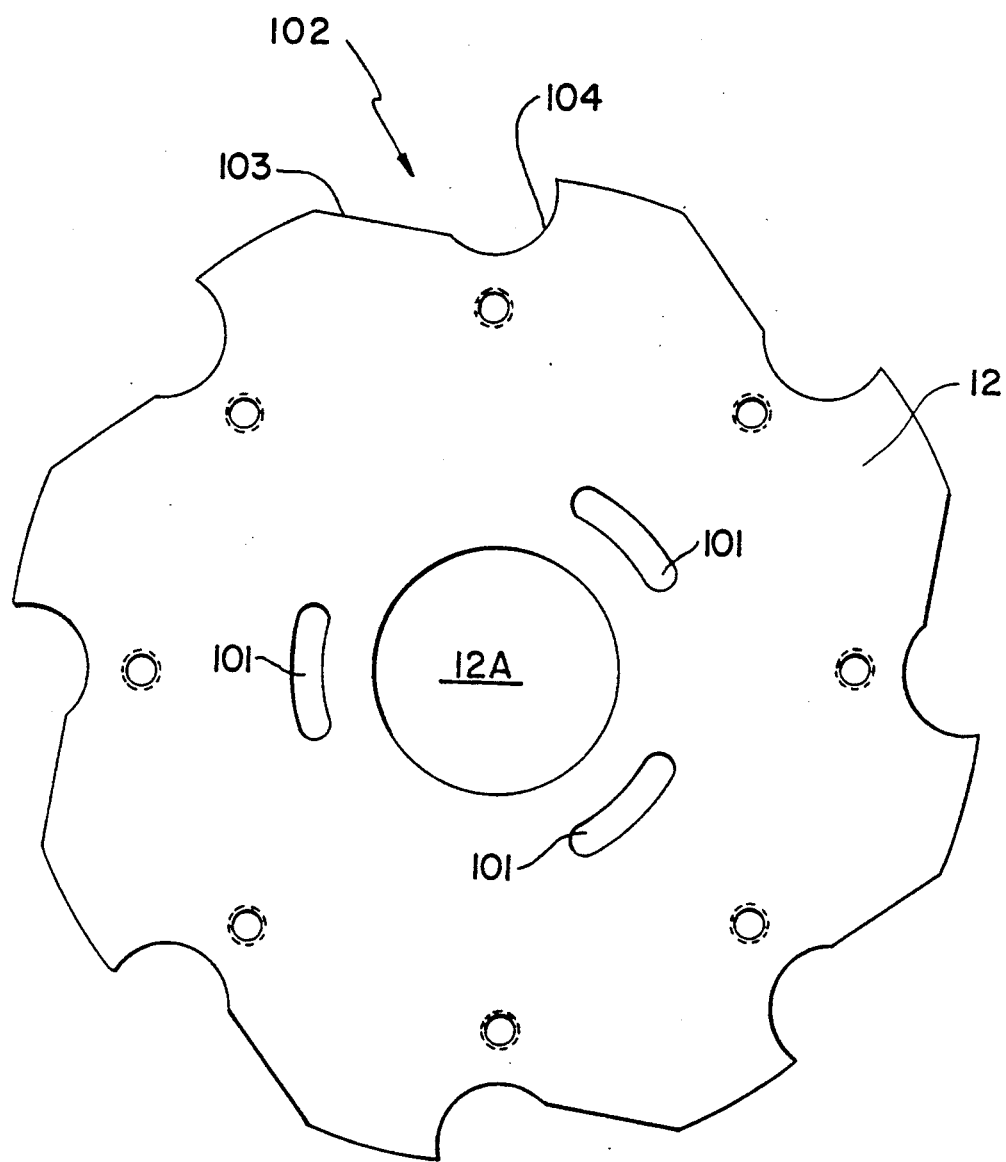
FIG. 5 is a top plan view of a lower turret wheel.

FIG. 5 illustrates the first turret wheel 12 which includes a plurality of recesses 102 disposed around the outer circumferential surface thereof. Each recess 102 includes an inclined guide surface 103 and a locating notch 104. For brevity, numbers have not been applied to each of the recesses 102. However, each of the recesses 102 is designed to include a similar shape and is utilized to accurately position the first work piece 61 relative to the first turret wheel 12. Adjusting slots 101 are provided adjacent to the aperture 12A. The adjusting slots 101 are utilized to accurately position the first turret wheel 12 relative to the second turret wheel 14.

In operation, a first work piece 61 is permitted to be directly supplied to a first plate 54 by means of the lower part infeed chute 301 and slides along an inclined guide surface 103 into the locating notch 104. The first cam guide 54A, the first plate 54 and the locating notch 104 accurately positions the first work piece 61 relative to the first turret wheel 12.

Similarly, a second work piece 62 is directly supplied to a second plate 55 by means of the upper part infeed chute 302 and slides along the inclined guide surface 203 into the locating notch 204. The second cam guide 55A, the second plate 55 and the locating notch 204 accurately position the second work piece 62 relative to the second turret wheel 14.

The present invention permits a first work piece 61 and a second work piece 62 to be supplied directly to a turret module 90 and accurately aligned relative to each other by means of the locating notches 104, 204 disposed on the first turret wheel 12 and second turret wheel 14 which are aligned relative to each other.

As the turret module 90 rotates together with the turret drive shaft 50, the cam surface 38 engages each of the followers 94 to cause the slide housing 95 to move up and down, thereby engaging the work tool member 100 relative to the second work piece 62. The second plate 55 extends around the outer circumference of the second turret wheel 14 only a predetermined location and eventually permits the second work piece 62 to engage the first work piece 61, thereby permitting the work tool member 100 to perform an assembly process of assembling the second work piece 62 relative to the first work piece 61.

A return spring 98 returns the slide housing 95 to a disengaged position after the cam follower is released from the cam surface 38. Thus, as the turret module 90 rotates around together with the turret drive shaft 50, work is performed at each of the work stations associated with each locating notch 104, 204 on the first turret wheel 12 and second turret wheel 14. Finally, the assembled work pieces are discharged from the turret module 90 at the exit station 303.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A self contained exchangeable turret assembly comprising:
    a turret module, said turret module including a first turret wheel having a plurality of openings disposed around an outer circumferential surface thereof for positioning a first work piece, a second turret wheel having a plurality of openings disposed around an outer circumferential surface thereof for positioning a second work piece in a predetermined position relative to a first work piece, a turret drive shaft, and a plurality of tool stations;
    said first and second turret wheels being concentrically positioned on said turret drive shaft in a predetermined relationship to permit selective alignment of said plurality of openings disposed around the outer circumferential surfaces of said first and second turret wheels;
    a support structure;
    drive means operatively mounted relative to said support housing for imparting rotation to said turret drive shaft and said first and second turret wheels;
    cam means operatively mounted relative to said support housing and said tool stations for selectively actuating said tool stations as said drive means rotates said first and second turret wheels;
    connecting means for readily connecting and disconnecting said turret module to said support structure; and
    a coupling for permitting the connection of said drive means to said turret drive shaft and permitting the disconnection of said drive means to said turret drive shaft;
    said turret module is a self contained, exchangeable turret readily attachable to said support housing and engagable with said drive means and readily detachable from said support housing and disengagable from said drive means for permitting one of a plurality of turret modules capable of preforming work on a variety of work pieces having various configurations to be readily, operatively connected to said supporting housing.

2. The self contained exchangeable turret assembly according to claim 1, wherein said openings disposed around the outer circumferential surface of said first turret wheel each includes an inclined guide surface and a locating notch for positioning a work piece relative to said first turret wheel.

3. The self contained exchangeable turret assembly according to claim 1, wherein said openings disposed around the outer circumferential surface of said second turret wheel each includes an inclined guide surface and a locating notch for positioning a work piece relative to said second turret wheel.

4. The self contained exchangeable turret assembly according to claim 1, wherein each said tool station includes a slide housing and a cam follower, said cam follower being selectively engageable with said cam means for imparting movement to said slide housing for engaging a work tool member with a work piece.

5. The self contained exchangeable turret assembly according to claim 1, wherein said first turret wheel and said second turret wheel are spaced a predetermined distance apart and are affixed relative to each other for aligning said plurality of openings in said first and second turret wheels relative to each other.

6. The self contained exchangeable turret assembly according to claim 1, wherein said cam means is a cam slide mounted in a predetermined location around the outer peripheral surface of said first and second turret wheels.

7. The self contained exchangeable turret assembly according to claim 1, and further including a first plate operatively mounted adjacent to said first turret wheel for supporting a first work piece relative to said openings in said first turret wheel.

8. The self contained exchangeable turret assembly according to claim 1, and further including a second plate operatively mounted adjacent to said second turret wheel for supporting a first work piece relative to said openings in said second turret wheel.

9. The self contained exchangeable turret assembly according to claim 7, wherein said first plate is stationary.

10. The self contained exchangeable turret assembly according to claim 8, wherein said second plate is stationary.

11. The self contained exchangeable turret assembly according to claim 7, and further including a first cam guide positioned adjacent to said first turret wheel for guiding a work piece into one of the openings in said first turret wheel during rotation thereof.

12. The self contained exchangeable turret assembly according to claim 7, and further including a second cam guide positioned adjacent to said second turret wheel for guiding a work piece into one of the openings in said second turret wheel during rotation thereof.

* * * * *